US012802324B2

(12) United States Patent
Sigrist

(10) Patent No.: US 12,802,324 B2
(45) Date of Patent: Nov. 17, 2026

(54) SYSTEM FOR ILLUMINATING THE FACE

(71) Applicant: Valentin SIGRIST, Speicher (CH)

(72) Inventor: Valentin Sigrist, Speicher (CH)

( * ) Notice: Subject to any disclaimer, the term of this patent is extended or adjusted under 35 U.S.C. 154(b) by 126 days.

(21) Appl. No.: 18/792,197

(22) Filed: Aug. 1, 2024

(65) Prior Publication Data

US 2025/0045998 A1 Feb. 6, 2025

(30) Foreign Application Priority Data

Aug. 3, 2023 (EP) .................................... 23189568

(51) Int. Cl.
*G06T 13/40* (2011.01)
*G06F 3/01* (2006.01)
*G06T 15/50* (2011.01)

(52) U.S. Cl.
CPC .............. *G06T 13/40* (2013.01); *G06F 3/012* (2013.01); *G06T 15/506* (2013.01)

(58) Field of Classification Search
None
See application file for complete search history.

(56) References Cited

U.S. PATENT DOCUMENTS

2009/0225065 A1* 9/2009 Overes .................. H05B 47/11 345/207
2016/0341959 A1* 11/2016 Gibbs .................. A63F 13/213
2021/0319621 A1* 10/2021 Qiao ..................... G06T 3/4038

FOREIGN PATENT DOCUMENTS

EP 3096208 A1 11/2016
EP 3252566 A1 12/2017
EP 3500911 6/2019

OTHER PUBLICATIONS

EPO Action—Application No. 23189568.1—Aug. 1, 2024.

* cited by examiner

*Primary Examiner* — Tammy Paige Goddard

(74) *Attorney, Agent, or Firm* — Muncy, Geissler, Olds & Lowe, P.C.

(57) ABSTRACT

The disclosure relates to a system for providing a simulation-based virtual reality to a user, and includes an illumination unit to illuminate at least a part of a face of the user and a control unit. The control unit receives information from a computing unit. The computing unit creates a model of the face from three-dimensional information relating to the face to create the simulation, The model of the face is used for creating the simulation, to calculate an illumination of the model of the face in the simulation, and to transmit information to the control unit. The control unit controls the illumination unit based on the information from the computing unit regarding the illumination of the model of the face in the simulation such that an illumination of the face by the illumination unit corresponds to the illumination of the model of the face in the simulation.

15 Claims, 10 Drawing Sheets

SYSTEM FOR ILLUMINATING THE FACE

The present application claims priority to European Patent Application No. 23189568.1, filed Aug. 3, 2023, which is incorporated herein by reference in its entirety.

FIELD OF THE INVENTION

The present invention relates to a system for providing a simulation-based virtual reality to a user of the system.

BACKGROUND OF THE INVENTION

Head Mounted Displays (HMD) or VR glasses are common systems used to provide the user with an interactive simulated reality. The simulation provided is created by a software developer (e.g. the manufacturer of a video game) and then displayed to the user via the HMD so that the user has the feeling of being in the simulation, The HMD therefore creates a virtual reality based on the simulation, which is played to the user, e.g. via the display in the HMD, or with which the user can interact using their own avatar, for example.

The user can move his avatar, for example, by moving a controller, a joystick or by moving his body in an environment detected by sensors within a simulated environment. During this movement of the avatar in the simulated environment, the avatar is illuminated by various light sources and the direction from which these light sources shine on the avatar changes as the movement progresses.

As a result, the illumination of the avatar in the simulation is also constantly changing, in particular the direction of the illumination and the intensity of the illumination. For example, weather influences in the simulation (e.g. rainy weather or sunshine) can cause the brightness of a simulated sun in the simulation to decrease or increase.

Accordingly, these changes to the lighting conditions in the simulation affect the illumination of the avatar's face, wherein changes to the lighting conditions of the avatar's face in prior art HMD systems are communicated to the user of the system via the display built into the HMD, in particular by increasing or decreasing the brightness of the display.

However, since the display is designed as a larger surface with a certain distance to the user's face and thus emits light corresponding to the representation of the simulation, it is not possible in prior art HMD systems to selectively illuminate certain parts of the user's face in the display area of the HMD with light in different colors and intensities in such a way that the illumination of the user's face in the display area of the HMD corresponds to the illumination of this facial area of the avatar in the simulation.

Particularly noteworthy here is the user's nose, which on the one hand is in the user's field of vision and on the other hand is particularly easily illuminated by the display due to its raised architecture. If, for example, a rainy, dark environment is shown in the simulation in which the avatar is moving, the display illuminates the nose to show the simulation, even though the avatar's nose is not directly illuminated in the simulation. On the other hand, if a very sunny, bright area is displayed in the simulation, the brightness of the display may not be sufficient to illuminate the user's nose in the HMD according to the brightness of the illumination of the avatar's nose in the simulation. Since the nose is in the user's field of vision, this inadequate illumination of the nose may cause the user to subconsciously perceive this illumination, somewhat disrupting their experience of virtual reality or causing them to perceive virtual reality as less realistic.

OBJECT OF THE INVENTION

It is therefore an object of the invention to provide a system that overcomes the disadvantages of the prior art.

Another object is to provide a system that enables the user to have an improved experience of virtual reality based on a simulation.

It is a further object to provide a system that provides the user with virtual reality in such a way that the user perceives the virtual reality as more realistic, in particular with regard to the provision of illumination of parts of the user's face.

These objects are solved by the realization of at least some of the characterizing features of the independent claims. Features which further develop the invention in an alternative or advantageous manner can be taken from some of the other features of the independent claims and the dependent claims.

SUMMARY OF THE INVENTION

The invention relates to a system for providing a simulation-based virtual reality to a user of the system, wherein the system comprises:

- an illumination unit designed to variably illuminate at least a part of a face of the user, in particular a nose of the user, and.
- a control unit, wherein the control unit is designed to receive information from a computing unit, wherein the computing unit is designed for the purpose of
  - creating a model of the face, in particular a three-dimensional model (3D model), from three-dimensional information relating to the face, in particular optically recorded information,
  - creating the simulation, wherein the model of the face is taken into account when creating the simulation,
  - integrating the model of the face into the simulation,
  - calculating an illumination of the model of the face in the simulation, and
  - transmitting information to the control unit, wherein the control unit is designed to receive information from the computing unit regarding the illumination of the model of the face in the simulation, wherein the control unit controls the illumination unit based on the information regarding the illumination of the model of the face in the simulation such that an illumination of the face by the illumination unit corresponds to the illumination of the model of the face in the simulation.

The term "corresponding" means that the illumination of the face by the illumination unit is related to the illumination of the model of the face in the simulation, in particular wherein this relationship is such that the two illuminations converge (or also that the illumination of the face by the illumination unit approaches the illumination of the model of the face in the simulation, whereby the two illuminations are similar). In the optimum case, the illumination of the face by the illumination unit and the illumination of the model of the face in the simulation correspond (or are related) in such a way that the illumination of the face by the illumination unit corresponds to the illumination of the model of the face in the simulation (or also that the illumination of the face by the illumination unit and the illumination of the model of the face in the simulation are similar/correspond/match).

The system attempts to control the illumination unit in such a way that the illumination of the face by the illumination unit corresponds to the illumination of the model of the face in the simulation. However, exact equality of these two illuminations is very difficult or sometimes impossible to achieve in reality, since parameters such as the light intensity, light temperature, light color and/or illuminance of the illumination in the simulation, in particular the illumination of the model of the face in the simulation, can vary greatly depending on the creation of the simulation/programming, while these parameters can be varied much less in the illumination of the face in reality (for example by the illumination unit within VR glasses) due to technical limitations. Such technical limitations can be caused, for example, by the fact that the light source (e.g. one or more LEDs) of the illumination unit can only emit light in a certain wavelength range (which in turn influences the light color) or in a certain intensity range. The control unit receives the information regarding the illumination of the model of the face in the simulation from the computing unit and then controls the illumination unit in such a way that the illumination of the face by the illumination unit corresponds to the illumination of the model of the face in the simulation within the framework of the technical conditions present, for example, due to the design of the light source and/or the structure of the illumination chamber within the VR goggles, in particular wherein this correspondence is formed such that the two illuminations converge (i.e. the illumination of the face by the illumination units converges—as closely as possible—to the illumination of the model of the face in the simulation). In the best case, the two illuminations are identical or so identical (or converge in such a way) that the user's vision and subconscious cannot perceive any differences in the illumination, thus enabling a more realistic provision of virtual reality by the system according to the invention.

Because the system according to the invention ensures that the illumination of the user's face converges (or at least approximately coincides) with the illumination of the model of the face in the simulation and the previously described differences in illumination as in VR systems of the prior art cannot occur, wherein these differences in illumination are at least subconsciously perceived by the user, the user perceives the virtual reality conveyed to him as more realistic than in VR systems of the prior art through the use of the system according to the invention.

In addition to an (artificially created) computer-animated environment/world, as used for computer games, for example, the term simulation also refers to a (3D) film or film sequence, a (3D) image, etc., which can be displayed to the user of the system and thus enables them to immerse themselves in a virtual reality. By means of the computing unit, the model of the face can be used, for example, to create the avatar's face in a computer game and/or the model of the face can be inserted into a movie, for example.

The control unit is designed, for example, as a control unit (as used in the automotive industry, for example) or as a microcontroller (MCU). The control unit receives information/data from the computing unit, processes this data and sends corresponding commands to the illumination unit. As microcontrollers in particular are small in size, the control unit can also be integrated into the illumination unit, allowing the system comprising the illumination unit and control unit to be compact and in one piece, which in turn facilitates installation in visual output devices such as VR glasses for the user.

The computing unit is designed, for example, as a processor, in particular as a microprocessor, which can receive, process and transmit data (e.g. the three-dimensional information relating to the face available as data).

The three-dimensional information relating to the face is, for example, information relating to the spatial extension of the face, such as the width, height and depth of the face, the facial geometry or the geometry and arrangement of parts of the face, but also information relating to the presence of elevations, such as the nose, or depressions, such as scars. This three-dimensional information about the face can be extracted from photos of the face taken by a camera, for example, using photogrammetry. Alternatively or in addition to this, several (at least two) images of the face (taken from different positions, but with a certain degree of overlap) can first be stitched together into one image using a "stitching" process and then the three-dimensional information relating to the face (as 3D data) can be extracted from this stitched image using photogrammetry.

The three-dimensional information relating to the face can be derived/obtained, for example, from (2D and/or 3D) image data recorded by a camera, for example, light imaging detection ranging data (LIDAR data) or 3D point cloud data recorded by a laser scanner, for example.

The model of the face can, for example, be a three-dimensional surface mesh (wireframe model).

Information regarding the illumination of the model of the face in the simulation can be, for example: which parts of the face and from which direction they are illuminated; with which intensity (how strong) the respective parts of the face are illuminated; and/or with which light temperature/light color the respective parts of the face are illuminated.

The system according to the invention can, for example, only be designed as an illumination unit with a control unit, wherein this system can then be attached to, for example, VR glasses that display the virtual reality based on the simulation for the user. The system is arranged, for example, in the inner area designed as a kind of chamber, i.e. the part of the VR goggles located between the display unit (e.g. screen) and the user's face (e.g. at arrangement/fixing points in the VR goggles specially provided for such a system) and can illuminate the part of the user's face located inside the chamber of the VR goggles from there. The control unit exchanges information with the computing unit. In this embodiment, this computing unit is not part of the system, but is designed, for example, as a processor on a computer or in the VR glasses. The computing unit transmits information/data regarding the illumination of the model of the face in the simulation to the control unit, for example by means of a cable or wireless data transmission, whereupon the control unit then controls the illumination unit in order to illuminate the face in the VR glasses accordingly. The advantage of this design of the system according to the invention is that existing VR systems without an illumination unit can easily be retrofitted with the system according to the invention.

In an exemplary embodiment of the system according to the invention, the system has the computing unit, a first recording unit, in particular a camera, wherein the first recording unit is designed to record the three-dimensional information relating to the face, in particular optically, and/or a visual output device or head-mounted display (HMD), in particular glasses for displaying the virtual reality or virtual reality glasses (VR glasses), wherein the visual output device is designed to display the virtual reality to the user, and/or a display unit, wherein the display unit is designed as a screen, wherein the simulation can be displayed on the screen.

The system according to the invention can, for example, also be designed as a type of overall system in which the illumination unit, the control unit and the computing unit are permanently installed in the visual output device, e.g. the VR glasses. The first recording unit can, for example, also be permanently installed in this overall system or be designed as a separate recording unit, e.g. a smartphone, which records images of the user's face and sends them to the computing unit. The advantage of this design of the system according to the invention is that the individual components can be matched to each other in their external shape and their technical modification during production or at the latest during assembly, so that on the one hand the design and/or accuracy of fit and on the other hand the technical interaction, in particular of the electronics, is less susceptible to faults.

In a further exemplary embodiment of the system according to the invention, the computing unit uses setting parameters, in particular setting parameters such as skin color, accessories such as glasses and/or jewelry, light preferences, in particular light intensity, light temperature, light color and/or illuminance, of the illumination in the simulation, in particular the illumination of the model of the face in the simulation, and/or the illumination of the face by the illumination unit, which can be provided by a manual input of the user and/or by an input of a provider/manufacturer of the simulation (e.g. a software developer), in particular via a programming interface or an application programming interface (API interface), for.

- the creation of the model of the face,
- the creation of the simulation,
- the integration of the model of the face into the simulation, and/or.
- the calculation of the illumination of the model of the face in the simulation.

This embodiment has the advantage that the user and/or the provider/manufacturer of the simulation (e.g. the developer of a computer game) can provide information, e.g. settings with regard to the model of the face, settings with regard to the avatar, settings with regard to the properties of the light in the simulation and/or settings with regard to the properties of the light emitted by the illumination unit, to the computing unit and thus the illumination by the illumination unit, the illumination in the simulation and/or the illumination of the model of the face in the simulation can be (individually) adjusted according to the corresponding wishes.

In another exemplary embodiment, the first recording unit is arranged at the visual output device, and/or captures movements of the face as updated three-dimensional information relating to the face and the computing unit adjusts the model of the face based on the updated three-dimensional information relating to the face.

This embodiment has the advantage that the model of the face created by the computing unit can be constantly updated, whereby the illumination of the updated model of the face in the simulation is also updated. If there is a change in the illumination of the model of the face in the simulation, the system according to the invention is able to control the illumination unit by means of the control unit in such a way that the illumination of the face by the illumination unit corresponds to the illumination of the updated model of the face in the simulation (or is approximated to the illumination of the updated model of the face in the simulation or corresponds to the illumination of the updated model). In this way, the user perceives the virtual reality conveyed as very realistic even after moving his face.

In a further exemplary embodiment, the visual output device has a first motion sensor which is designed to detect a movement of the user's head.

In this way, movements of the visual output device and thus head movements of the user are detected and the orientation of the face relative to the rest of the body and/or relative to the orientation of the face before the head movement is derived from this by means of the computing unit. This information about the orientation of the face can be further processed by the computing unit, whereby, among other things, the orientation of the model of the face in the simulation (relative to the orientation of the model of the face before the head movement) can be determined. From this, the computing unit can, for example, derive changes in the illumination of the model of the face in the simulation (e.g. the model of the face in the simulation is less strongly illuminated when the head and thus the face turns away from the sun and vice versa). This detected change in the illumination of the model of the face in the simulation is transmitted as information from the computing unit to the control unit, wherein the control unit then controls the illumination unit accordingly in order to equalize the illumination conditions of the model of the face in the simulation and the face within the visual output device.

In a further exemplary embodiment, the system comprises at least one movement unit (e.g. a controller, a joystick, etc.), wherein the at least one movement unit

- is arranged on a part of the user's body, in particular on a hand, and
- has a second motion sensor which is designed to detect a movement of said body part.

In a further exemplary embodiment, the visual output device and the at least one movement unit each have at least one position sensor, wherein the computing unit determines a position of the visual output device and, in this way, of the user's face relative to a position of the at least one movement unit.

In a further exemplary embodiment, the computing unit uses the data provided by the first motion sensor, the second motion sensor and/or the respective position sensors for

- creating the simulation, and/or
- calculating the illumination of the model of the face in the simulation.

In a further exemplary embodiment, for creating the simulation, and/or for calculating the illumination of the model of the face in the simulation, in particular taking into account the provided setting parameters, the computing unit calculates.

- the direction from which light from a light source provided in the simulation shines on the model of the face in the simulation,
- how the light, in particular light intensity, light temperature, light color and/or illuminance, of the light source illuminates the model of the face in the simulation,
- how a facial geometry derived from the three-dimensional information recorded by the first recording unit influences the illumination of the model of the face in the simulation,
- where the model of the face is located in the simulation relative to the light source,
- whether other body parts, in particular the body part on which the at least one movement unit is arranged, cast shadows on the model of the face in the simulation, whereby in particular the illuminance is reduced in areas in which shadows are cast on the model of the face in the simulation, how weather influences in the simulation affect the illumination of the model of the face in the simulation, in particular with regard to light intensity, light temperature, illuminance and/or reflections, how far away the light source is from the model of the face in the simulation, and/or how the light from the light source is reflected by objects in the simulation, in particular wherein the computing unit uses light sources of the simulation that are in the user's field of vision and/or light sources of the simulation that are not in the user's field of vision for the calculation.

This embodiment has the advantage that the computing unit constantly recalculates the illumination of the model of the face in the simulation. If there are changes in the illumination of the model of the face in the simulation, the Illumination unit adjusts the illumination of the face in the visual output device accordingly, whereby the realistic experience of the virtual reality conveyed is maintained for the user even if the aforementioned aspects in the simulation change.

A further exemplary embodiment of the system according to the invention, wherein the first recording unit records the user's line of vision, the computing unit derives a field of view of the user from the viewing direction detected by the first recording unit, and the control unit controls the illumination unit in such a way that the illumination is dimmed and/or switched off on the parts of the face that are not in the user's field of vision, and/or the illumination is intensified on the parts of the face that are in the user's field of vision.

This embodiment has the advantage that in particular the parts of the face that are in the user's field of vision and are therefore perceived at least subconsciously can be illuminated particularly well or the illumination of these parts of the face by the illumination unit comes particularly close to the illumination of these parts of the face in the simulation, which makes the virtual reality feel particularly real for the user of the system.

In a further exemplary embodiment, the illumination unit has a light source, in particular a light-emitting diode (LED).

This embodiment has the advantage that the illumination unit can be obtained easily and cheaply.

In a further exemplary embodiment, the illumination unit has two light sources, in particular LEDs, wherein a first light source, in particular a first LED, is arranged and aligned in such a way that an upper part of the user's nose is illuminated, and a second light source, in particular a second LED, is arranged and aligned in such a way that a lower part of the user's nose is illuminated.

This embodiment has the advantage that the illumination unit can illuminate different areas of the nose differently and independently of each other in order to be able to simulate the presence of differently illuminated nose areas of the facial model in the simulation. In this way, the virtual reality feels particularly real to the user of the system.

In a further exemplary embodiment, the illumination unit has a light directing element, in particular a lens, and/or an aperture, each designed to focus light from the illumination unit onto a part of the user's face, in particular the user's nose.

This embodiment has the advantage that the illumination of the face by the illumination unit can be individually adapted to the user's wishes.

In a further exemplary embodiment, an arrangement of the light directing element and/or the aperture on the illumination unit can be changed in order to make the illumination unit adaptable to faces of different users.

This embodiment has the advantage that the system according to the invention can be used by several users and still ensures optimum illumination of the face by the Illumination unit and optimum wearing comfort for all users, even with different face shapes.

In a further exemplary embodiment, the system has a second recording unit, in particular a laser tracking system, wherein the second recording unit is arranged at a distance, in particular a predefined distance, from the user, so that three-dimensional information relating to an entire body of the user or at least the entire face can be recorded by the second recording unit, in particular wherein three-dimensional information relating to the parts of the face which are obscured by the visual output device cannot be recorded by the second recording unit, the second recording unit is designed to record the head movement of the user, movements of parts of the user's body and/or a position of the face relative to the body, in particular to moving parts of the user's body, and/or the computing unit processes the three-dimensional information recorded by the second recording unit combined with the three-dimensional information relating to the face captured by the first recording unit, and/or for the creation of the model of the face, the creation of the simulation and/or the calculation of the illumination of the model of the face in the simulation.

In a further exemplary embodiment, the illumination unit has a plurality of light sources, in particular a plurality of LEDs, wherein the plurality of light sources are arranged in a defined arrangement on the illumination unit, in particular wherein the arrangement of the plurality of light sources corresponds to a row, a column, and/or a matrix, in particular a 2×2 matrix or a 4×4 matrix.

This embodiment has the advantage that the parts of the face can be illuminated from different directions and/or each part of the face to be illuminated can be illuminated by its "own" light source thanks to the multiple light sources and a corresponding arrangement of these light sources.

In a further exemplary embodiment, the illumination unit is connected to the visual output device or to a computer, in particular one having the computing unit, for the supply of energy and/or for the exchange of data/information, in particular by means of a cable, and/or is designed for wireless data transmission, in particular by means of Bluetooth, and/or has a battery unit for the wireless energy supply.

In a further exemplary embodiment, the illumination unit is arranged on the visual output device in such a way that parts of the user's face, in particular eyelashes or eyebrows, do not cast any unwanted shadows on the user's face when the face is Illuminated by the illumination unit. As a result, the user's experience of virtual reality is not disturbed by unwanted shadows.

In a further exemplary embodiment, the illumination unit (or the system comprising illumination unit and control unit) is arranged on the visual output device, in particular at a predefined arrangement point.

This embodiment has the advantage that visual output devices, e.g. VR glasses, can be upgraded with an illumination unit (or the system consisting of illumination unit and control unit) very easily and without great effort for the user, and the attached illumination unit is then also directly positioned/aligned correctly.

In another exemplary embodiment, a computer, a game console, the visual output device and/or the illumination unit comprises the computing unit.

This embodiment has the advantage that the computing unit can be provided either by an external device such as a computer and/or the illumination unit (or the system comprising the illumination unit and the control unit), whereby the structure of the system according to the invention can be designed very flexibly and the system can thus be adapted to the needs of the user. Furthermore, it is advantageous if the computing unit is contained in an external device such as a computer, since this external device can normally provide a greater computing capacity than, for example, a microprocessor in the illumination unit (or the system comprising the illumination unit and the control unit).

BRIEF DESCRIPTION OF THE DRAWINGS

The system according to the invention is described in more detail below by way of embodiment examples shown schematically by way of examples in the figures. Identical elements are marked with the same reference signs in the figures. The embodiments described are generally not shown to scale and are not to be understood as a limitation, wherein the figures show in detail.

DETAILED DESCRIPTION OF THE DRAWINGS

Figure 1A:
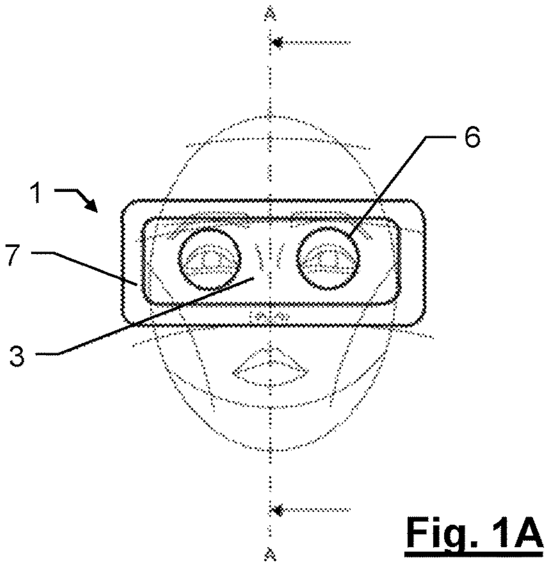
FIGS. 1A-1D: show a schematic representation of the creation of the model of the user's face by means of an exemplary embodiment of the system according to the invention.

FIGS. 1A to 1D show a schematic representation of the creation of the model of the user's face by means of an exemplary embodiment of the system 1 according to the invention. In this embodiment, the system 1 has the visual output device 7 for displaying a simulation, wherein the visual output device 7 is designed as VR glasses. The VR glasses 7 form a type of chamber 10 that encloses the eye area and parts of the nose 4. A display unit 8 is arranged in this chamber 10 of the VR glasses 7, wherein the display unit 8 is designed as a screen for visual display of the simulation.

Furthermore, the first recording unit 6 is arranged in the chamber 10 of the VR glasses 7, wherein the first recording unit 6 records three-dimensional information (data) 5 relating to the face, from which a three-dimensional surface mesh (also: 3D surface mesh) of the part of the user's face 3 is obtained, which is enclosed by the VR glasses 7 and can therefore be recorded by the first recording unit 6. The (wireframe) model of the face, in particular a three-dimensional model, is created from this three-dimensional surface mesh 5 by means of the computing unit.

FIG. 1A shows that, in the illustrated embodiment, the first recording unit 6 is formed in two parts, with one part of the first recording unit being ring-shaped or formed as a type of round lens and arranged at eye level in the chamber 10 of the VR glasses 7. The user can look through the first recording unit 6 at the display unit 8, whereby the simulation can be displayed to the user at the same time, the user can be immersed in virtual reality and the first recording unit 6 can record three-dimensional information (data) 5 relating to the face.

In a further embodiment, the first recording unit 6 is designed in such a way that movements of the face 3 are recorded by the first recording unit 6 and the three-dimensional information 5 relating to the face is updated accordingly. The computing unit then adapts the model of the face based on the updated three-dimensional information relating to the face.

In a further embodiment, the system 1 has a memory unit which is designed to store the captured and/or updated three-dimensional information (data) 5 relating to the face. The three-dimensional information (data) 5 recorded and/or updated by the first recording unit 6 can be transferred directly from the first recording unit 6 to the computing unit and/or transferred from the first recording unit 6 to the storage unit for creating the model of the face by the computing unit, wherein the computing unit can retrieve and process the three-dimensional information (data) 5 stored there with respect to the face as required for creating the model of the face, for creating the simulation, for integrating the model of the face into the simulation, and/or for calculating the illumination of the model of the face in the simulation.

Figure 1B:
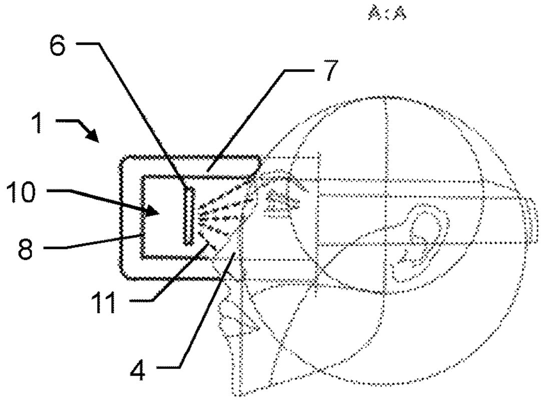

FIG. 1B shows that in the embodiment shown, the first recording unit 6 is arranged approximately in the center of the chamber 10 of the VR glasses 7 or halfway between the user's face 3 and the display unit 8. The dashed lines 11 illustrate the recording area (scan area) of the first recording unit 6.

Figure 1C:
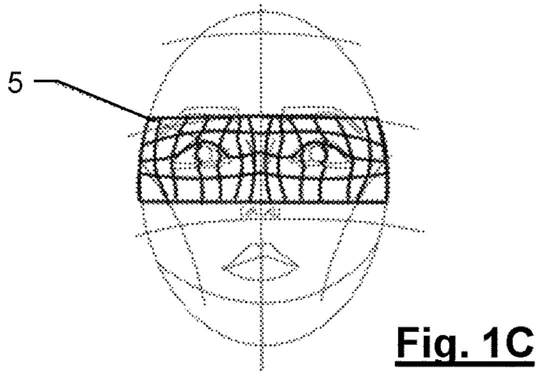
Figure 1D:
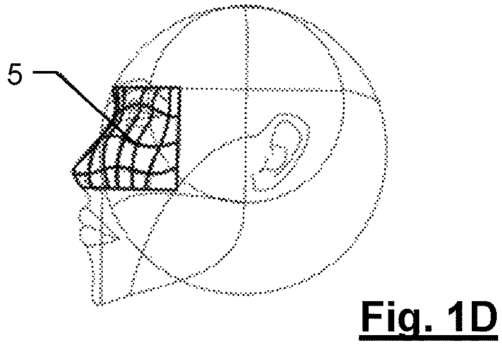

FIGS. 1C and 1D show the 3D surface mesh 5 generated from the three-dimensional information (data) recorded by the first recording unit 6.

FIGS. 2A to 2D show a schematic representation of the illumination of the user's face 3 by means of an exemplary embodiment of the system 1 according to the invention.

The illumination unit 2 is designed as an oval ring, wherein the oval ring consists of a plurality of sections 12 arranged next to each other. Light sources 9 are arranged in these sections, wherein these light sources 9 can be light-emitting diodes (LEDs) (connected in series), for example. The respective sections 12 of the illumination unit 2 can be of different sizes, with the sections 12 being larger in the outer areas of the oval, i.e. in the areas next to the eyes, and becoming smaller and smaller towards the center of the oval, i.e. the areas around the nose. In this way, the light sources 9 in the large sections 12 can be arranged further apart from each other, whereby the outer areas of the face 3 are less strongly illuminated. The illumination of the outer side of the face 3 does not have to be as strong, since light sources 9 located further out are no longer in the user's field of vision, light sources 9 located on one outer side are shielded from the other side by the face 3, as a result of which the shielded outer side is not illuminated by these light sources 9 and is therefore darker, and there are no elevations such as the nose 4 in these outer areas, which can be very easily illuminated from many sides. For the reasons mentioned, the nose area 4 is preferably to be illuminated very brightly, which is why the smaller sections 12 around the nose area 4 allow many light sources 9 to be arranged close together to provide this bright illumination.

Because the illumination unit 2 is designed as an oval ring, the user can look through the illumination unit 2 to the display unit 8, which allows the simulation to be displayed to the user at the same time.

Figure 2A:
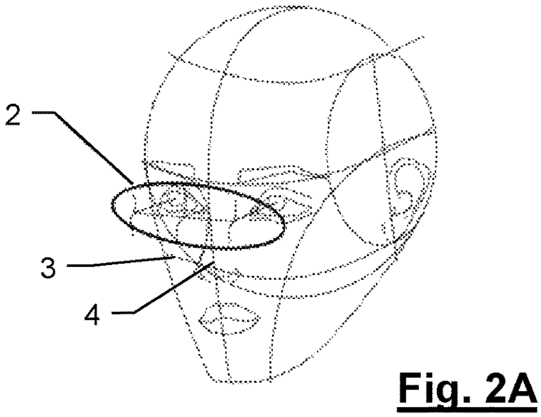
FIGS. 2A-2D: show a schematic representation of the illumination of the user's face by means of an exemplary embodiment of the system according to the invention.
Figure 2B:
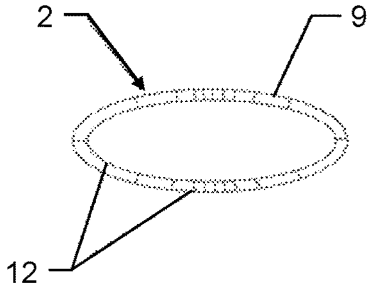
Figure 2C:
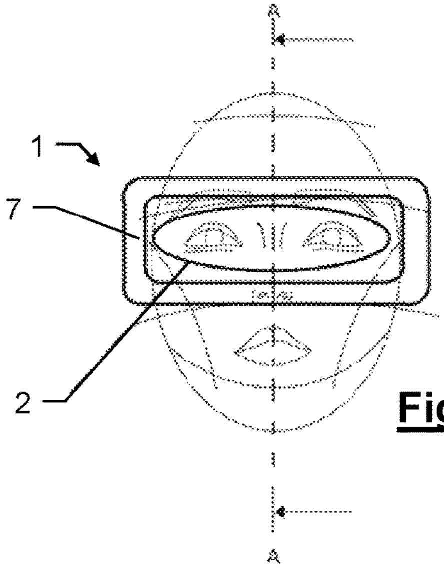
Figure 2D:
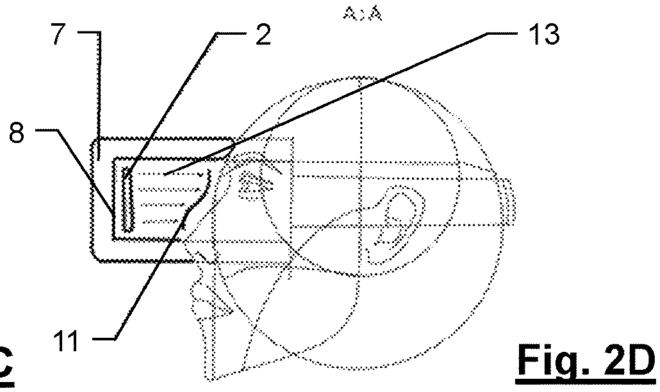

FIG. 2D shows that in the embodiment shown, the illumination unit 2 is located at the very back of the chamber of the VR glasses 7 or at a short distance from the display unit 8. The arrows 13 illustrate the light beams emitted by the illumination unit 2.

The illumination unit 2 is not necessarily arranged on the visual output device 7, but can also be designed as a separate unit which, together with the control unit, forms the system 1 according to the invention. Accordingly, prior art visual output devices, e.g. VR glasses, can be upgraded with the system 1 according to the invention (Illumination unit 2 and control unit). The computing unit can be designed as part of this system 1 or as part of the visual output device 7 and/or as part of a separate device, e.g. a computer. The power supply, communication and/or data transmission between the system 1 according to the invention and the computing unit can be carried out by means of cables and/or wireless data transmission, in particular by means of Bluetooth. In a further embodiment, the system 1 according to the invention has the illumination unit 2, the control unit, the computing unit, the first recording unit 6 and the visual output device 7, in particular designed as HMD or VR glasses.

FIGS. 3A to 7C show schematic representations of the illumination of the nose 4 of the user of the system 1 as a function of the position of the illumination unit. 2 relative to the visual output device 7.

Figure 3A:
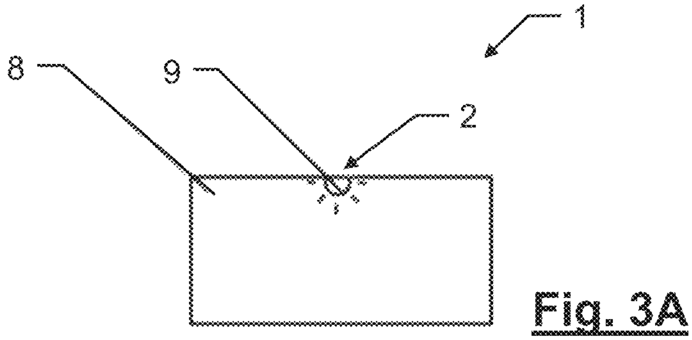
FIGS. 3A-7C: show schematic representations of the illumination of the nose of the user of the system depending on the position of the illumination unit on the visual output device.

FIG. 3A shows a top view of the display unit 8, which is designed as a screen, from the perspective of the user of the HMD 7 or the VR glasses 7. The position of the illumination unit 2 is shown schematically as a sun, wherein this is not intended to express that the illumination unit 2 is a single light source 9, for example a single LED. Rather, the illumination unit 2 can be an arrangement of several light sources 9 (e.g. LEDs), which are, however, arranged at a specific position in the chamber 10 of the VR glasses 7.

Figure 3B:
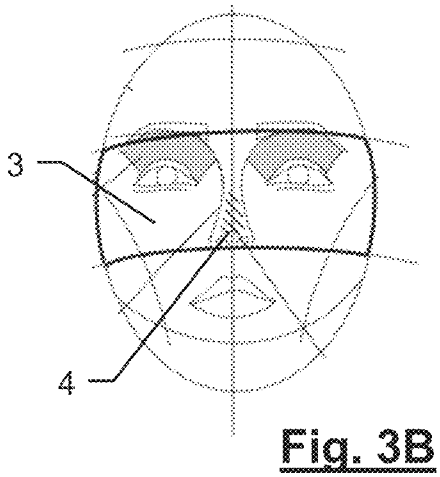
Figure 3C:
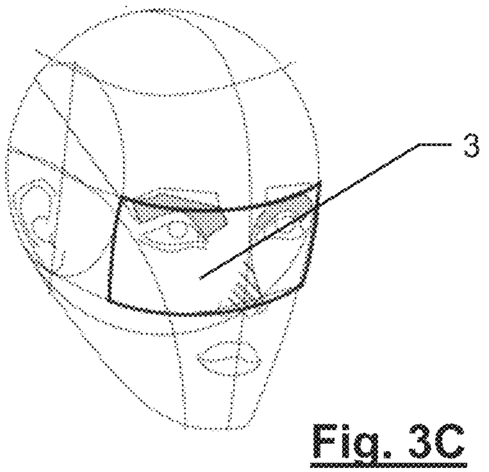

In FIGS. 3A to 3C, the illumination unit 2 is positioned centrally and above the display unit 8, as a result of which the tip of the user's nose is very well illuminated. The illuminated parts of the face 3 are marked as hatched areas in FIGS. 3A to 7C. Due to the frontal illumination of the face 3 from above, parts of the face 3, such as the eye sockets, are barely illuminated or not illuminated at all. The parts of the face that are barely illuminated or not illuminated at all are marked as gray, flat areas in FIGS. 3A to 7C.

Figure 4A:
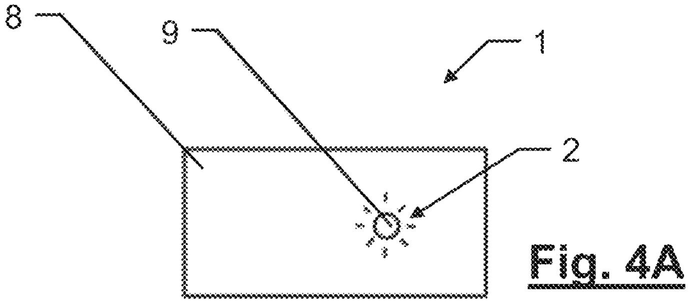
Figure 4B:
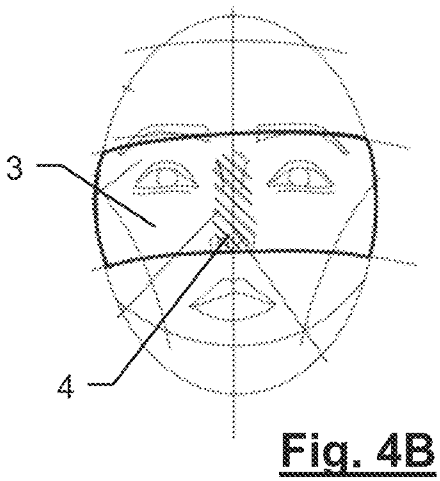
Figure 4C:
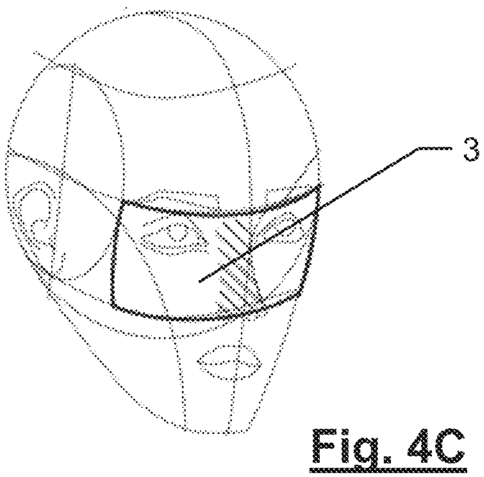

In FIGS. 4A to 4C, the illumination unit 2 is positioned centrally (slightly offset to the side) and approximately at eye level in front of the display unit 8, which means that the user's entire nose 4, in particular the entire bridge of the nose up to the tip of the nose, is very well illuminated.

Figure 5A:
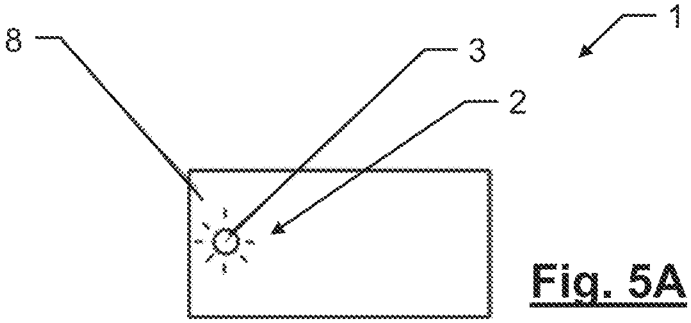
Figure 5B:
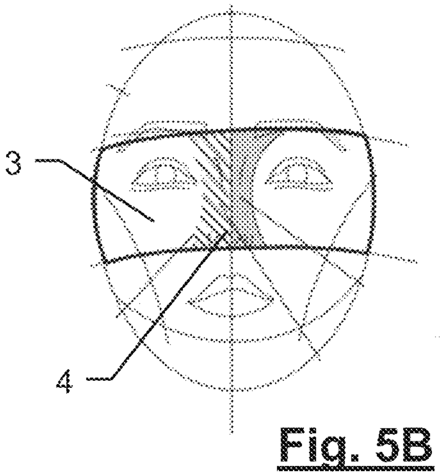
Figure 5C:
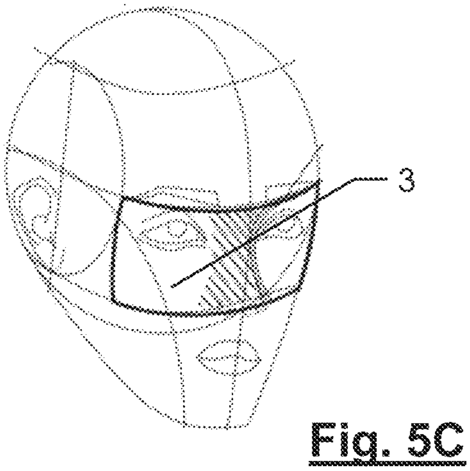

In FIGS. 5A to 5C, the illumination unit 2 is clearly offset laterally (i.e. on the outer side edge of the display unit 8) and positioned approximately at eye level in front of the display unit 8, as a result of which the side of the nose facing the light source 9 is very well illuminated (shaded area). The side of the nose 4 facing away from the light source 9, on the other hand, is barely illuminated or not illuminated at all (gray area).

Figure 6A:
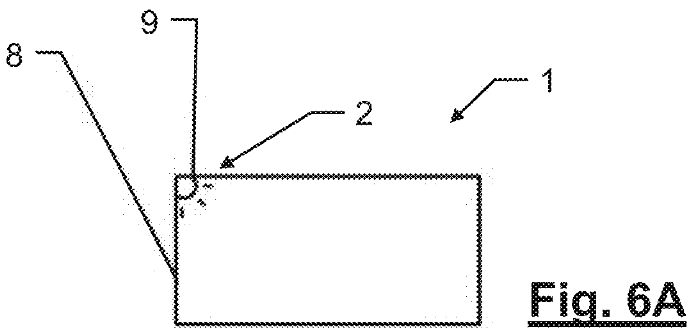
Figure 6B:
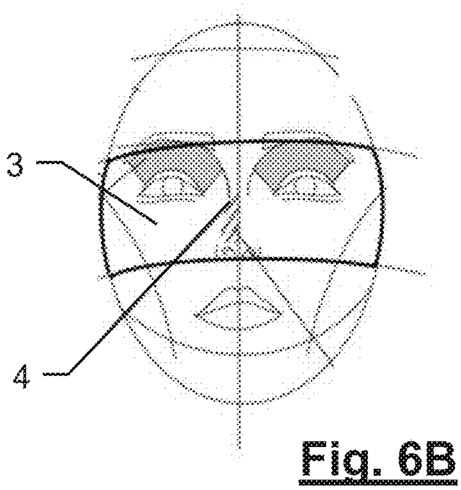
Figure 6C:
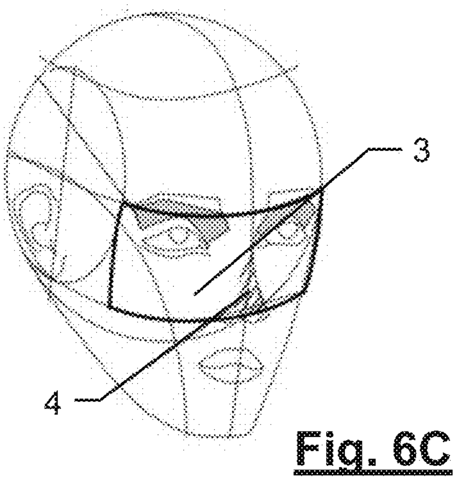

In FIGS. 6A to 6C, the illumination unit 2 is clearly offset laterally (i.e. on the outer side edge of the display unit 8) and positioned on the upper edge of the display unit 8, as a result of which the tip of the nose is very well illuminated on the side of the nose 4 facing the light source 9 (shaded area). The eye sockets, on the other hand, are barely illuminated or not illuminated at all (gray area).

Figure 7A:
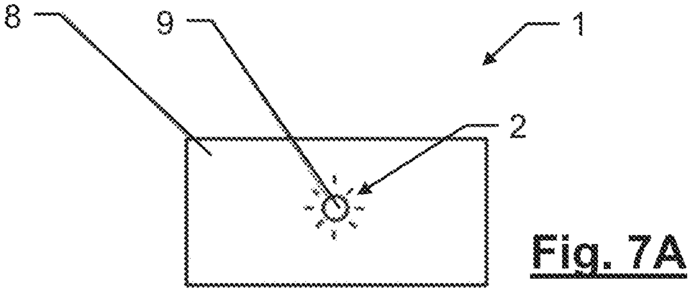
Figure 7B:
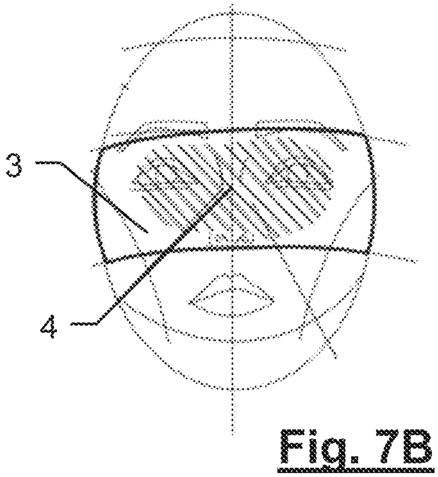
Figure 7C:
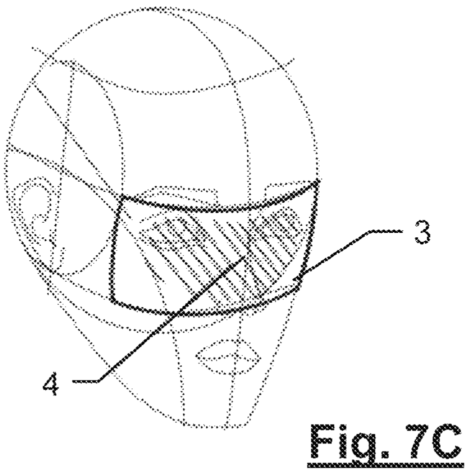

In FIGS. 7A to 7C, the illumination unit 2 is positioned centrally and approximately at eye level in front of the display unit 8, which means that the central area of the entire face 3 in particular is very well illuminated (shaded area).

Figure 8:
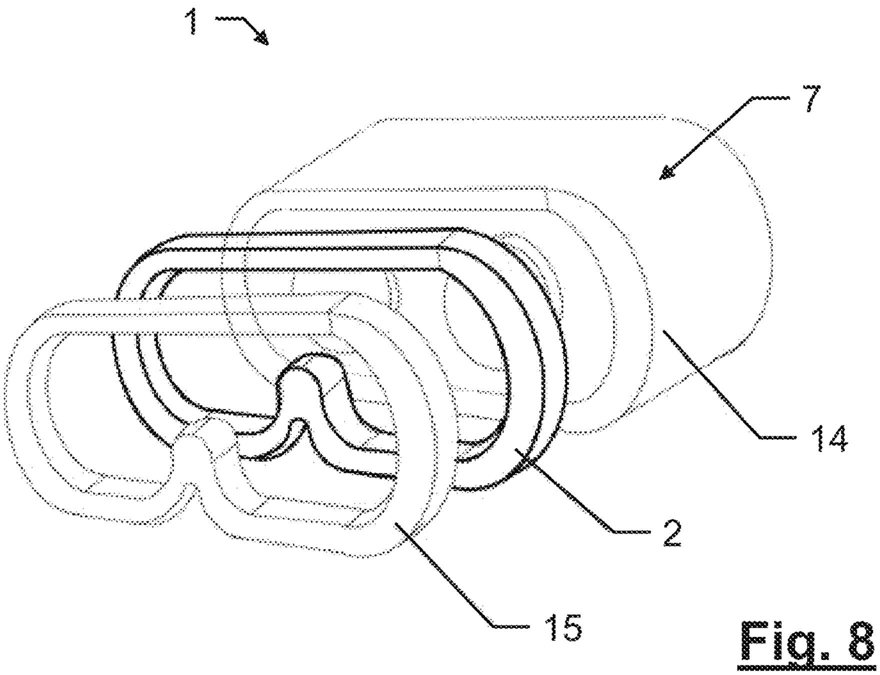
FIG. 8: shows an exploded view of an exemplary embodiment of the system according to the invention.

Whether small parts of the face 3, such as in FIGS. 3A to 6C, or larger areas, such as in FIGS. 7A to 7C, are illuminated depends not only on the positioning of the illumination unit 2 on the visual output device 7, in particular the VR glasses, but also very much on the design of the illumination unit 2. For example, if the illumination unit 2 is designed as one or at least a few LEDs 9, small parts of the face 3 can be illuminated very specifically without the other parts of the face 3 being illuminated. If, on the other hand, the illumination unit 2 is designed as an oval ring with a larger circumference, as in the example in FIG. 28, a larger area of the face 3 can be illuminated, FIG. 8 shows an exploded view of an exemplary embodiment of the system 1 according to the invention, comprising a main housing 14 of the VR glasses 7, an illumination unit 2 and a face pad 15 (e.g. a face cushion) which is placed on the face 3 when the user looks into the visual output device 7 formed as VR glasses 7. In this embodiment, the illumination unit 2 is formed in the shape of the face pad 15 and thus forms a border for the part of the face 3 that is located within the face pad 15. Since a plurality of light sources 9 (e.g. a plurality of LEDs) can be arranged at different, defined positions within the illumination unit 2 formed as a border, the corresponding (adjacent) part of the user's face 3 can be illuminated by the light source 9 of the illumination unit. 2 by controlling the corresponding light source 9.

Figure 9A:
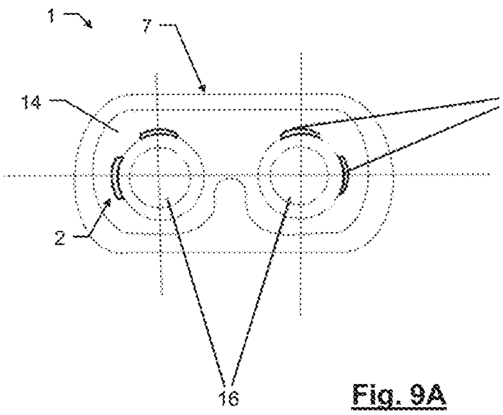
FIGS. 9A-9B: show perspective views of an exemplary embodiment of the system according to the invention.
Figure 9B:
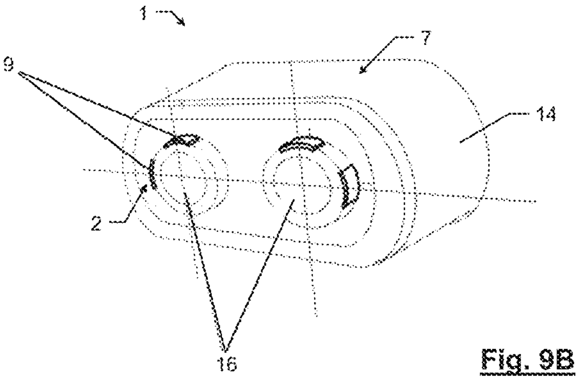

FIGS. 9A and 9B show perspective views of an exemplary embodiment of the system 1 according to the invention. In this embodiment, the housing 14 of the VR glasses 7 has two elevations 16 which are designed to be placed on the user's eyes in order to enable the user to look at the display unit 8 inside the housing 14 of the VR glasses 7. The illumination unit 2 is designed in such a way that the light sources 9 of the illumination unit 2 are arranged on the elevations 16 of the housing 14 of the VR glasses 7, whereby parts of the user's face 3, in particular the eye area and the nose 4, can be illuminated.

Figure 10A:
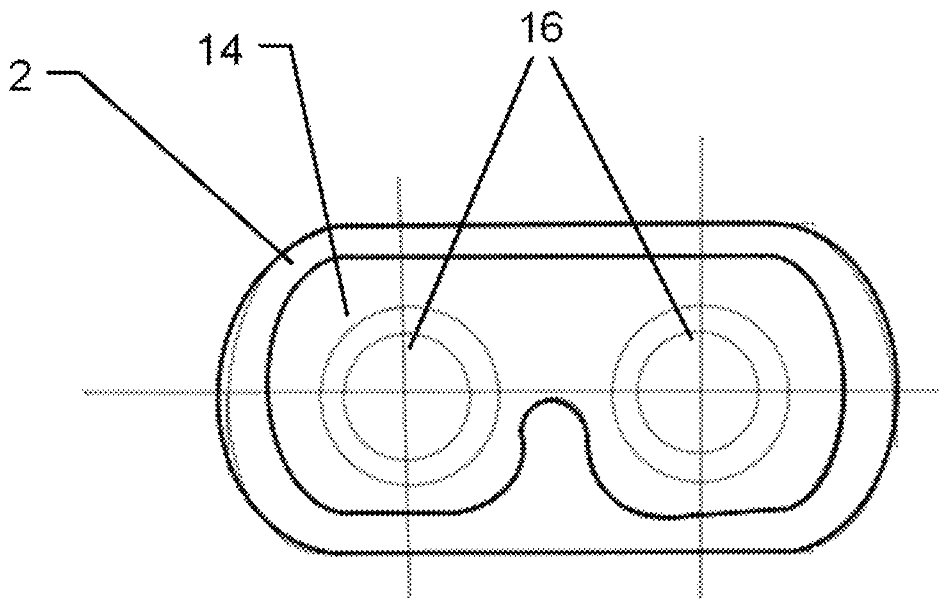
FIGS. 10A-10B: show perspective views of an exemplary embodiment of the system according to the invention.
Figure 10B:
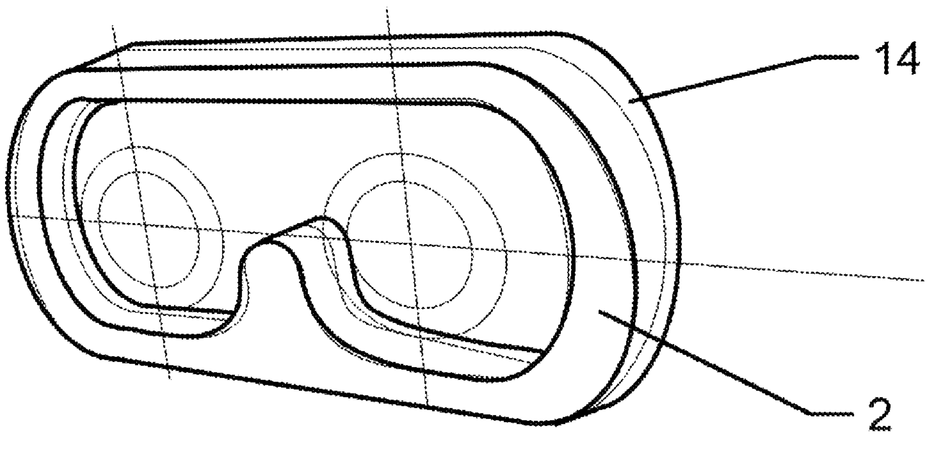

FIGS. 10A and 10B show perspective views of an exemplary embodiment of the system 1 according to the invention. In this embodiment, the illumination unit 2 is also designed as a face pad at the same time, wherein this illumination unit 2 is designed to be placed on the outside of a visual output device, for example VR glasses, of the prior art and attached to it. In this way, existing VR systems can be easily upgraded with the system 1 according to the invention.

It should be understood that the figures shown are only schematic representations of possible embodiment examples. The various approaches can also be combined with each other and with prior art methods.

The invention claimed is:

1. A system for providing a simulation-based virtual reality to a user of the system, comprising an illumination unit designed to variably illuminate at least a part of a face of the user, in particular a nose of the user, and a control unit, wherein the control unit is designed to receive information from a computing unit, wherein the computing unit is designed for the purpose of creating a model of the face, in particular a three-dimensional model (3D model), from three-dimensional information relating to the face, in particular optically recorded information, creating the simulation, wherein the model of the face is taken into account when creating the simulation, integrating the model of the face into the simulation, calculating an illumination of the model of the face in the simulation, and transmitting information to the control unit, wherein the control unit is designed to receive information from the computing unit regarding the illumination of the model of the face in the simulation, wherein the control unit controls the illumination unit based on the information regarding the illumination of the model of the face in the simulation such that an illumination of the face by the illumination unit corresponds to the illumination of the model of the face in the simulation.

2. The system according to claim 1, wherein the system comprises the computing unit, comprises a first recording unit, in particular a camera, wherein the first recording unit is designed to record the three-dimensional information relating to the face, in particular optically, and/or comprises a visual output device, wherein the visual output device is designed to display the virtual reality to the user, and/or has a display unit, wherein the display unit is designed as a screen, wherein the simulation can be displayed on the screen.

3. The system according to claim 1, wherein the computing unit uses setting parameters, in particular setting parameters such as skin color, accessories such as glasses and/or jewelry, light preferences, in particular light intensity, light temperature, light color and/or illuminance, of the illumination in the simulation, in particular of the illumination of the model of the face in the simulation, and/or of the illumination of the face by the illumination unit, which can be provided by a manual input of the user and/or by an input of a provider of the simulation, in particular via a programming interface, for the creation of the model of the face, the creation of the simulation, the integration of the model of the face into the simulation, and/or the calculation of the illumination of the model of the face in the simulation.

4. The system according to claim 2, wherein the first receiving unit is arranged on the visual output device, and/or records movements of the face as updated three-dimensional information relating to the face and the computing unit adapts the model of the face based on the updated three-dimensional information relating to the face.

5. The system according to claim 2, wherein the visual output device comprises a first motion sensor adapted to detect a head movement of the user.

6. The system according to claim 1, wherein the system comprises at least one movement unit, wherein the at least one movement unit is arranged on a part of the user's body, in particular on a hand, and has a second motion sensor which is designed to detect a movement of said body part.

7. The system according to claim 5, wherein the visual output device and the at least one movement unit each have at least one position sensor, wherein the computing unit determines a position of the visual output device and, in this way, of the user's face relative to a position of the at least one movement unit.

8. The system according to claim 5, wherein the computing unit uses the data provided by the first motion sensor, the second motion sensor and/or the respective position sensors for creating the simulation, and/or calculating the illumination of the model of the face in the simulation.

9. The system according to claim 3, wherein, for creating the simulation, and/or calculating the illumination of the model of the face in the simulation, in particular taking into account the provided setting parameters, the computing unit calculates the direction from which light from a light source provided in the simulation shines on the model of the face in the simulation, how the light, in particular light intensity, light temperature, light color and/or illuminance, of the light source illuminates the model of the face in the simulation, how a facial geometry derived from the three-dimensional information relating to the face recorded by the first recording unit influences the illumination of the model of the face in the simulation, where the model of the face is located in the simulation relative to the light source, whether other body parts, in particular the body part on which the at least one movement unit is arranged, cast shadows on the model of the face in the simulation, whereby in particular the illuminance is reduced in areas in which shadows are cast on the model of the face in the simulation, how weather influences in the simulation affect the illumination of the model of the face in the simulation, in particular with regard to light intensity, light temperature, illuminance and/or reflections, how far away the light source is from the model of the face in the simulation, and/or how the light from the light source is reflected by objects in the simulation, in particular wherein the computing unit uses light sources of the simulation that are in the user's field of vision and/or light sources of the simulation that are not in the user's field of vision for the calculation.

10. The system according to claim 2, wherein the first recording unit detects the user's line of vision, the computing unit derives a field of view of the user from the direction of gaze detected by the first recording unit, and the control unit controls the illumination unit in such a way that the illumination is dimmed and/or is switched off on the parts of the face that are not in the user's field of vision, and/or the illumination is intensified on the parts of the face that are in the user's field of vision.

11. The system according to claim 1, wherein the illumination unit has a light source, in particular a light-emitting diode (LED).

12. The system according to claim 1, wherein the illumination unit has two light sources, in particular LEDs, wherein a first light source, in particular a first LED, is arranged and aligned in such a way that an upper part of the user's nose is illuminated, and a second light source, in particular a second LED, is arranged and aligned in such a way that a lower part of the user's nose is illuminated.

13. The system according to claim 1, wherein the illumination unit comprises a light directing element, in particular a lens, and/or an aperture, each designed to focus light from the illumination unit onto a part of the user's face, in particular the user's nose.

14. The system according to claim 13, wherein an arrangement of the light directing element and/or the aperture on the illumination unit can be changed in order to make the illumination unit adaptable to faces of different users.

15. The system according to claim 2, wherein the system has a second recording unit, in particular a laser tracking system, wherein the second recording unit is arranged at a distance, in particular a predefined distance, from the user, so that three-dimensional information relating to an entire body of the user or at least the entire face can be recorded by the second recording unit, in particular wherein three-dimensional information relating to the parts of the face which are obscured by the visual output device cannot be recorded by the second recording unit, the second recording unit is designed to record the head movement of the user, movements of parts of the user's body and/or a position of the face relative to the body, in particular to moving parts of the user's body, and/or the computing unit processes the three-dimensional information recorded by the second recording unit combined with the three-dimensional information relating to the face captured by the first recording unit, and/or for the creation of the model of the face, the creation of the simulation and/or the calculation of the illumination of the model of the face in the simulation.

* * * * *